United States Patent
Ogawa et al.

(10) Patent No.: US 8,355,241 B2
(45) Date of Patent: *Jan. 15, 2013

(54) LAMINATED ELECTRONIC COMPONENT

(75) Inventors: Makoto Ogawa, Nagaokakyo (JP);
Akihiro Motoki, Nagaokakyo (JP);
Syunsuke Takeuchi, Nagaokakyo (JP);
Kenichi Kawasaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,072

(22) Filed: Nov. 10, 2010

(65) Prior Publication Data

US 2011/0122540 A1    May 26, 2011

(30) Foreign Application Priority Data

Nov. 20, 2009  (JP) .................................. 2009-264540

(51) Int. Cl.
*H01G 4/228* (2006.01)
*H01G 4/06* (2006.01)

(52) U.S. Cl. ......................................... 361/309; 361/311
(58) Field of Classification Search .............. 361/306.1, 361/306.3, 309, 311
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2009/0290280 A1* | 11/2009 | Takeuchi et al. ............... 361/303 |
| 2009/0291317 A1* | 11/2009 | Kawasaki et al. ............. 428/546 |

FOREIGN PATENT DOCUMENTS

WO    2007/049456 A1    5/2007

OTHER PUBLICATIONS

Takeuchi et al., "Laminated Electronic Component and Method for Manufacturing the Same", U.S. Appl. No. 12/466,393, filed May 15, 2009.
Kawasaki et al., "Laminated Electronic Component and Method for Manufacturing the Same", U.S. Appl. No. 12/466,435, filed May 15, 2009.

* cited by examiner

*Primary Examiner* — Eric Thomas
(74) *Attorney, Agent, or Firm* — Keating & Bennett, LLP

(57) ABSTRACT

A laminated electronic component includes a component body including a plurality of laminated functional layers, a plurality of internal conductors provided inside the component body, and an external terminal electrode that is electrically connected to an internal conductor via an exposed portion of the internal conductor and that is defined by a direct plating film. An average grain diameter of metal grains defining the plating film is about 0.1 μm or less.

3 Claims, 5 Drawing Sheets

LAMINATED ELECTRONIC COMPONENT

BACKGROUND OF THE INVENTION

1. Field of the Invention

The present invention relates to a laminated electronic component and a method of producing the same, and more particularly, to a laminated electronic component in which an external terminal electrode connected with an internal conductor is formed through a step of direct plating on an outer surface of an electronic component body.

2. Description of the Related Art

Recently, the market for small-sized portable electronic instruments, such as mobile phones, notebook personal computers, digital cameras, and digital audio instruments has been expanding. In such portable electronic instruments, not only is the size getting smaller, but also the performance is getting higher. Such a portable electronic instrument is equipped with a plurality of laminated ceramic electronic components, and smaller size and higher performance are also desired for these laminated ceramic electronic components. In a laminated ceramic capacitor, for example, smaller size and larger capacity are desired.

As an approach to achieve smaller size and larger capacity of the laminated ceramic capacitor, it is effective to reduce the thickness of the ceramic layer, and a capacitor having a ceramic layer with a thickness of about 3 μm or less has recently been developed. Presently, a further reduction in the thickness of the ceramic layer has been attempted. However, when the thickness of the ceramic layer is further reduced, a short circuit between internal electrodes is likely to occur.

As another approach, it is effective to increase an effective area of an internal electrode. However, in mass production of a laminated ceramic capacitor, a side margin between an internal electrode and a lateral surface of a ceramic base material and an end margin between an internal electrode and a ceramic base material end surface should be maintained to account for misalignment during the lamination of ceramic green sheets and misalignment during cutting. Therefore, when an effective area of an internal electrode is increased, it is necessary to increase the area of the ceramic layer so as to provide predetermined margins. However, there is a limit to the amount that the ceramic layer can be increased within a specified dimensional standard of the product, and the thickness of the external terminal electrode will prevent further increases in the area of the ceramic layer.

Conventionally, an external terminal electrode of a laminated ceramic capacitor is formed by applying and firing a conductive paste on a ceramic base material end portion. As a method for applying a conductive paste, it is conventional to dip a ceramic base material end portion into a paste vessel, followed by lifting it out of the paste vessel. However, with this method, the conductive paste is likely to be thicker in a central portion of the ceramic base material end surface due to the influence of viscosity of the conductive paste. Therefore, the thickness of the external terminal electrode partially increases, e.g., to greater than 30 μm, and it is not possible to sufficiently reduce the volume of the ceramic base material.

In response to this problem, a method of forming an external terminal electrode by direct plating has been proposed. According to this method, a plating film precipitates on an exposed portion of an internal electrode in a ceramic base material end surface as a nucleus, and the exposed portions of the neighboring internal electrodes are connected to each other as a result of growth of the plating film. According to this method, it is possible to form a thinner and flatter electrode film as compared to the conventional method using a conductive paste (see, for example, International Patent Publication No. 2007/049456).

However, when forming an external terminal electrode on the outer surface of an electronic component body, i.e., a ceramic base material, by direct plating, when an average grain diameter of metal grains in a plating film used to form the external terminal electrode is increased, a problem arises in that water enters through a gap between the electronic component body and the plating film. Further, when the thickness of the plating film is reduced, there is a problem in that the continuity of the plating film is deteriorated due to a reduced smoothness of the plating film. In these cases, there is a problem in that reliability is decreased, for example, the insulation resistance is decreased over time.

SUMMARY OF THE INVENTION

To overcome the problems described above, preferred embodiments of the present invention provide a laminated electronic component including an external terminal electrode formed by direct plating on an outer surface of an electronic component body that is less likely to have deteriorated characteristics and that has excellent durability.

A laminated electronic component according to a preferred embodiment of the present invention includes an electronic component body including a plurality of laminated functional layers, an internal conductor disposed inside the electronic component body and including an exposed portion on an outer surface of the electronic component body, and an external terminal electrode provided on the outer surface of the electronic component body in conduction with the internal conductor and arranged to cover the exposed portion of the internal conductor, and in which the external terminal electrode includes a plating film that is provided on the outer surface of the electronic component body by direct plating so as to cover the exposed portion of the internal conductor, and an average grain diameter of metal grains defining the plating film is preferably about 0.1 μm or less, for example. The external terminal electrode preferably further includes at least one upper layer plating film provided on the plating film.

The metal grains defining the plating film are preferably Cu grains, for example.

According to a preferred embodiment of the present invention, since the grain diameters of the metal grains defining the plating film are very small, a specific surface area of the surface of the plating film is increased, and even if there is a gap between the electronic component base material and the plating film, the gap is more likely to be filled by oxidation expansion of the plating film in the vicinity of the gap. Therefore, the entry of water is effectively prevented, and a laminated electronic component having excellent reliability is obtained.

Further, according to a preferred embodiment of the present invention, since the grain diameters of the metal grains defining the plating film are very small, activity with respect to the plating precipitating thereon is increased, and an upper layer plating film having a uniform thickness is obtained. In other words, the in-plane variations in film thickness of the upper layer plating are very small, such that the continuity of the plating film is less likely to decrease even if the thickness of the upper layer plating film is reduced.

Further, the metal grains defining the plating film are preferably Cu grains, for example. This is because Cu plating has a high throwing power with respect to an object to be plated, and even if the electronic component body has a large surface roughness, a gap is less likely to occur between the electronic component body and the plating film.

The above and other elements, features, steps, characteristics and advantages of the present invention will become more apparent from the following detailed description of the preferred embodiments with reference to the attached drawings.

DETAILED DESCRIPTION OF THE INVENTION

Preferred embodiments of the present invention are described below with reference to the drawings.

First Preferred Embodiment

In a first preferred embodiment of the present invention, a two-terminal laminated ceramic capacitor including a pair of external terminal electrodes defined by plating film layers is described as an example of a laminated electronic component.

Figure 1:
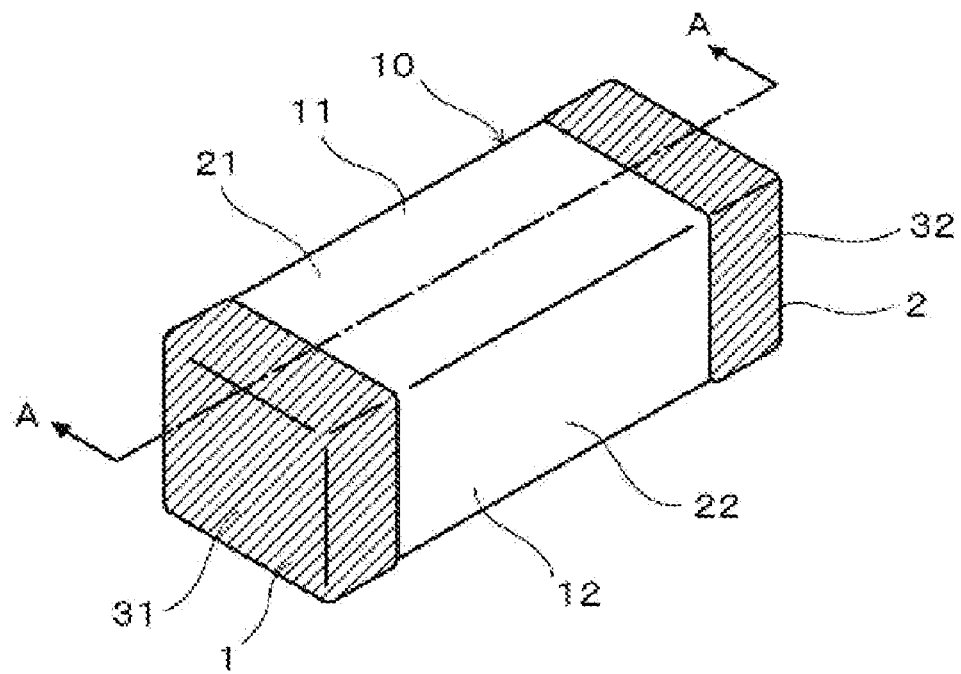
FIG. 1 is a perspective view showing a laminated electronic component according to a first preferred embodiment of the present invention.
Figure 2:
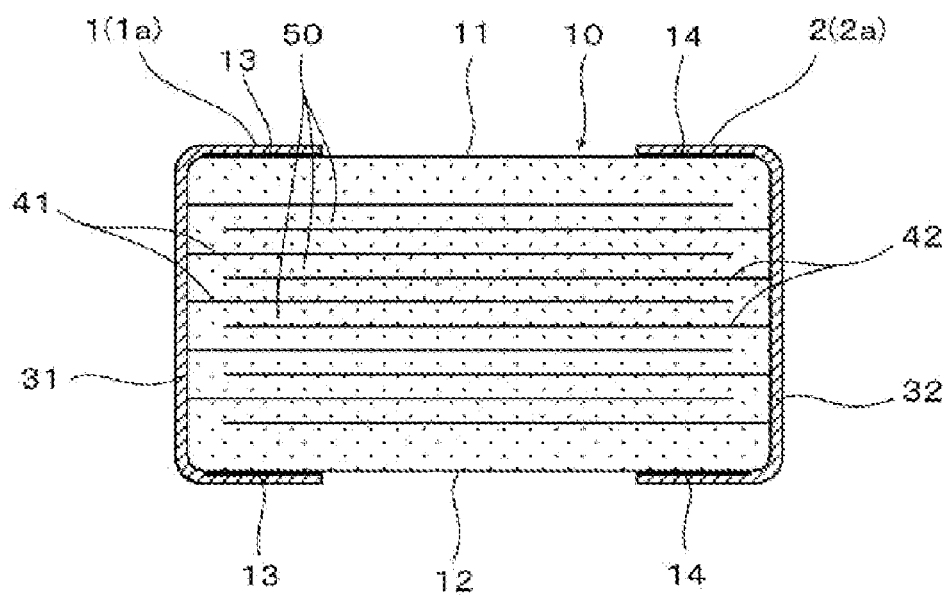
FIG. 2 is a cross section view along the line A-A in FIG. 1.
Figure 3:
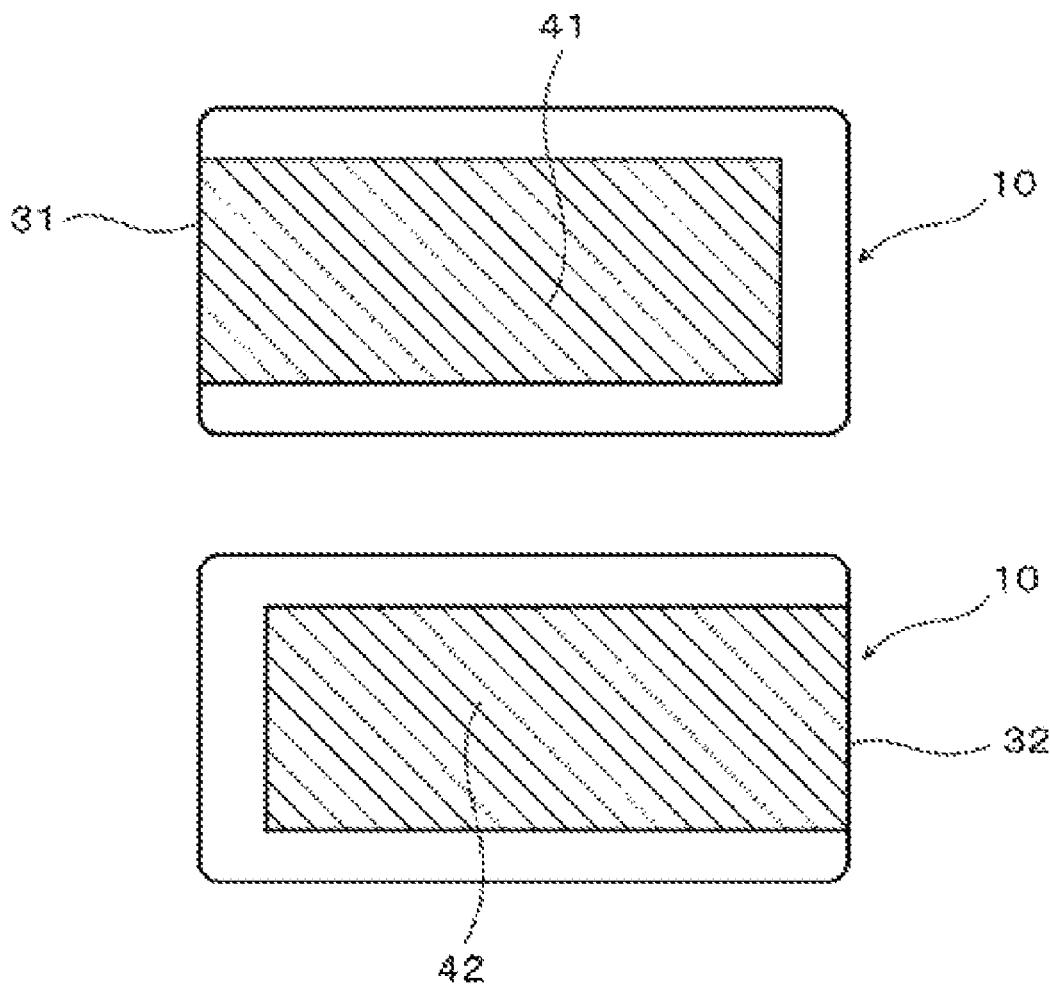
FIG. 3 is a view illustrating an internal electrode pattern of the laminated ceramic capacitor according to the first preferred embodiment of the present invention.
Figure 4:
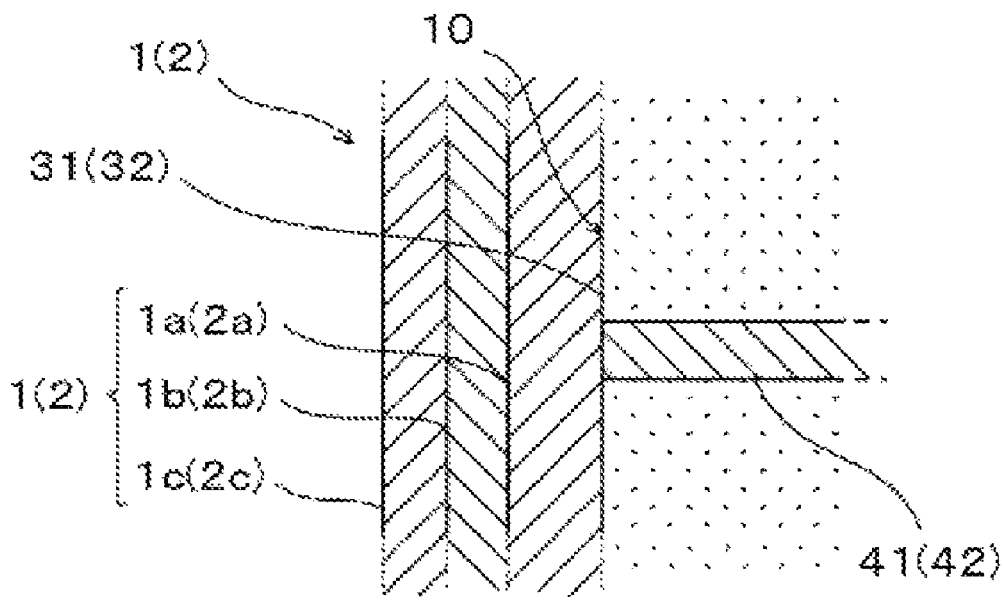
FIG. 4 is an enlarged view of a portion of the laminated ceramic capacitor according to the first preferred embodiment of the present invention.

FIG. 1 is a perspective view showing a laminated ceramic capacitor according to the first preferred embodiment of the present invention, FIG. 2 is a cross section view along the line A-A in FIG. 1, FIG. 3 is a view showing an internal electrode pattern of the laminated ceramic capacitor, and FIG. 4 is an enlarged view of a connecting portion between an external terminal electrode and an internal electrode.

The laminated ceramic capacitor includes a capacitor body 10 preferably having a substantially rectangular parallelepiped shape including a first main surface 11 and a second main surface 12 that are opposed to each other, a first lateral surface 21 and a second lateral surface 22 that are opposed to each other, and a first end surface 31 and a second end surface 32 that are opposed to each other, and the capacitor body 10 includes a plurality of laminated dielectric layers 50.

The first end surface 31 includes a first external terminal electrode 1 disposed thereon, and the second end surface includes a second external terminal electrode 2 disposed thereon. The first external terminal electrode 1 and the second external terminal electrode 2 are electrically insulated from each other.

On the first main surface 11 and the second main surface 12, a first surface conductor 13 and a second surface conductor 14 are preferably provided, and the first surface conductor 13 supports a turned-back portion of the first external terminal electrode 11, and the second surface conductor 14 supports a turned-back portion of the second external terminal electrode 12.

The first and second surface conductors 13 and 14 may also be provided on the first and second lateral surfaces 21 and 22. When it is not necessary to make the turned-back portions of the first and second external terminal electrodes 11 and 12 long, there is no need to provide the first and second surface conductors 13 and 14.

As shown in FIG. 2, inside the capacitor body 10, a first internal electrode 41 and a second internal electrode 42 are arranged to be opposed to each other via the dielectric layer 50. As shown in FIG. 3, the first internal electrode 41 extends to the first end surface 31 and is electrically connected to the first external terminal electrode 1. The second internal electrode 2 extends to the second end surface 32 and is electrically connected with the second external terminal electrode 2.

As shown in FIG. 4, the first external terminal electrode 1 (the second external terminal electrode 2) includes a plating film 1a (2a) preferably defined by a Cu plating film, for example, and an upper layer first plating film 1b (2b) preferably defined by a Ni plating film, for example, and an upper layer second plating film 1c (2c) preferably defined by a Sn plating film, for example, that define the upper layer plating film.

FIG. 4 shows the connecting portion between the first external terminal electrode 1 provided on the first end surface 31 of the capacitor body 10 and the first internal electrode 41. However, the connecting portion between the second external terminal electrode 2 (see FIGS. 1 and 2) and the second internal electrode 42 is substantially the same as that shown in FIG. 4, and thus, the plating film 2a, the upper layer first plating film 2b, the upper layer second plating film 2c, the second internal electrode 42 defining the second external terminal electrode 2 are shown in parentheses.

As shown in FIG. 4, the external terminal electrode 1 (2) of the laminated ceramic capacitor according to the first preferred embodiment preferably includes a triple-layered structure including the plating film 1a (2a), the upper layer first plating film 1b (2b), and the upper layer second plating film 1c (2c).

An average grain diameter of the metal grains defining the plating film 1a (2a) is preferably about 0.1 μm or less, for example. Average grain diameters of the upper layer first plating film 1b (2b) and the upper layer second plating film 1c (2c) are not particularly specified or limited.

The plating film and the upper layer plating film are preferably defined by a plating film including at least one metal selected from the group consisting of, for example, Cu, Ni, Sn, Pb, Au, Ag, Pd, Bi and Zn or of an alloy including such metals.

In the laminated ceramic capacitor of the first preferred embodiment, the plating film 1a (2a) preferably defined by a Cu plating film, for example, further decreases a gap with the capacitor body 10.

Further, the upper layer first plating film 1b (2b) preferably defined by a Ni plating film, for example, functions as a solder barrier.

Further, the upper layer second plating film 1c (2c) preferably defined by a Sn plating film, for example, functions to secure solder wettability.

The metal material of the plating film defining the outermost layer of the upper layer plating film (the upper-layer second plating film 1c (2c) in the first preferred embodiment) is preferably selected according to the mounting conditions. For example, Au may preferably be used when the product is mounted by wire bonding, and Cu and other suitable metal materials may preferably be used when the laminated electronic component is to be embedded in a substrate.

As a material defining the dielectric layer, for example, dielectric ceramics primarily composed of components. such as $BaTiO_3$ and $CaZrO_3$, for example, may preferably be used. Also additional components, such as a Mn compound, a rare earth compound, a Si compound, and a Mg compound, for example, may preferably be added to the main component.

The thickness of the dielectric layer after firing is preferably about 20 μm or less, for example, and more preferably about 10 μm or less, for example.

As a material defining the internal electrode, for example, Ni, Cu, Ag, Pd, a Ag—Pd alloy, Au and other suitable material may preferably be used.

The thickness of the internal electrode after firing is preferably about 0.1 μm to about 2.0 μm, for example.

A plating film defining the external terminal electrode is preferably a plating film made of a metal selected from the group consisting of, for example, Cu, Ni, Sn, Pb, Au, Ag, Pd, Bi and Zn or of an alloy including such metals. The thickness of the plating film is preferably about 1 μm to about 10 μm, for example.

Further, as a material of the upper layer plating film of the external terminal electrode, an appropriate metal material is preferably selected according to the mounting conditions.

For example, with a laminated ceramic electronic component mounted by soldering, a material that functions as a solder barrier, for example, Ni, a material with excellent solder wettability, for example, Sn, and other suitable material are preferably used.

When the laminated electronic component is mounted by wire bonding, Au, for example, is preferably used, and when the laminated electronic component is to be embedded in a substrate, Cu or other suitable material, for example, is preferably used.

Next, a production method of the laminated ceramic capacitor according to the first preferred embodiment will be described.

First, a ceramic green sheet and a conductive paste for internal electrodes are prepared. The ceramic green sheet and the conductive paste preferably include a binder and a solvent, and known organic binders and organic solvents may be appropriately selected and used.

Then on the ceramic green sheet, the conductive paste is printed in a predetermined pattern, for example, by screen printing, to form an internal electrode pattern.

Ceramic green sheets are laminated in a predetermined order so that a mother laminate is obtained wherein a predetermined number of ceramic green sheets on which internal electrode patterns are printed are laminated, and a predetermined number of ceramic green sheets defining outer layers in which an internal electrode pattern or an internal conductor pattern is not printed are disposed above and below the mother laminate. The mother laminate is crimped as necessary in the laminating direction by, for example, isostatic pressing or other suitable method.

Next, the unfired mother laminate is cut into a predetermined size, and an unfired capacitor body is cut out.

Then the cutout unfired capacitor body is fired. The firing temperature is preferably about 900° C. to about 1300° C. although the firing temperature varies depending on the type of ceramics defining the ceramic green sheet or the material defining the internal electrode.

A grinding treatment, such as barrel grinding, for example, is performed as necessary to conduct plane grinding of the exposed portion of the internal electrode. At this time, chamfering is preferably concurrently performed so that ridge portions and corner portions in the capacitor body are rounded.

A plating treatment is performed on the capacitor body, and metal grains precipitate on the exposed portions of the first and second internal electrodes 41 and 42 so as to form the plating films 1a and 2a as shown in FIG. 4.

To form the first and second surface conductors 13 and (see FIG. 2), a surface conductor pattern may be printed in advance on the outermost ceramic green sheet and fired concurrently with the ceramic base material, or a surface conductor may be printed on the main surface of the fired ceramic base material, followed by firing.

To form the plating films 1a and 2a, a Cu plating film, for example, is preferably directly formed on the end surface of the capacitor body 10, and an average grain diameter of the Cu grains is preferably selected to be about 0.1 μm or less, for example.

After the formation of a Cu plating film, Cu thick plating may be performed on the same.

Then, Ni electrolytic plating and Sn electrolytic plating, for example, are preferably performed, and on the plating film 1a (2a), the upper layer first plating film 1b (2b) formed of a Ni plating film and the upper layer second plating film 1c (2c) formed of a Sn plating film are formed.

Through these steps, the laminated ceramic capacitor as shown in FIG. 1 and FIG. 2 is produced.

In the production method described above, either of the electrolytic plating method and the electroless plating method may be used to form the external terminal electrode. However, it is usually preferable to use electrolytic plating because with electroless plating, a pretreatment by a catalyst is required to improve the plating precipitation speed, and thus, the process is complicated.

Further, it is preferable to use barrel plating wherein a capacitor body is placed in a barrel, and plating is performed while the barrel is rotated. However, other methods may be used.

Second Preferred Embodiment

Figure 5:
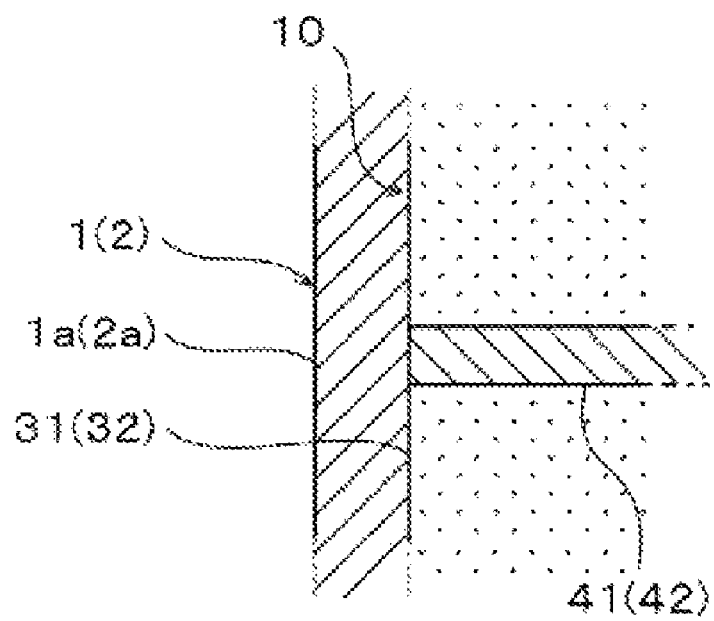
FIG. 5 is an enlarged view of a portion of a laminated ceramic capacitor according to a second preferred embodiment of the present invention.

FIG. 5 is an enlarged view of a portion of a laminated ceramic capacitor according to a second preferred embodiment of the present invention. The laminated ceramic capacitor of the second preferred embodiment is similar to the laminated ceramic capacitor of the first preferred embodiment, except that the first (and the second) external terminal electrodes 1 (2) are defined only of the plating films 1a (2a).

In FIG. 5 shows the connecting portion between the first external terminal electrode 1 provided on the first end surface 31 of the capacitor body 10 and the first internal electrode 41. However, the connecting portion between the second external terminal electrode 2 (see FIGS. 1 and 2) and the second internal electrode 42 is substantially the same as that shown in FIG. 5, and thus, the plating film 2a, the second internal electrode 42 and other elements defining the second external terminal electrode 2 are also shown in parentheses.

The laminated ceramic capacitor of the second preferred embodiment can also be produced by a method corresponding to the production method of the laminated ceramic capacitor of the first preferred embodiment.

However, the step of forming an upper layer plating film on the plating film in the step of forming the external terminal electrode is omitted.

Third Preferred Embodiment

Figure 6:
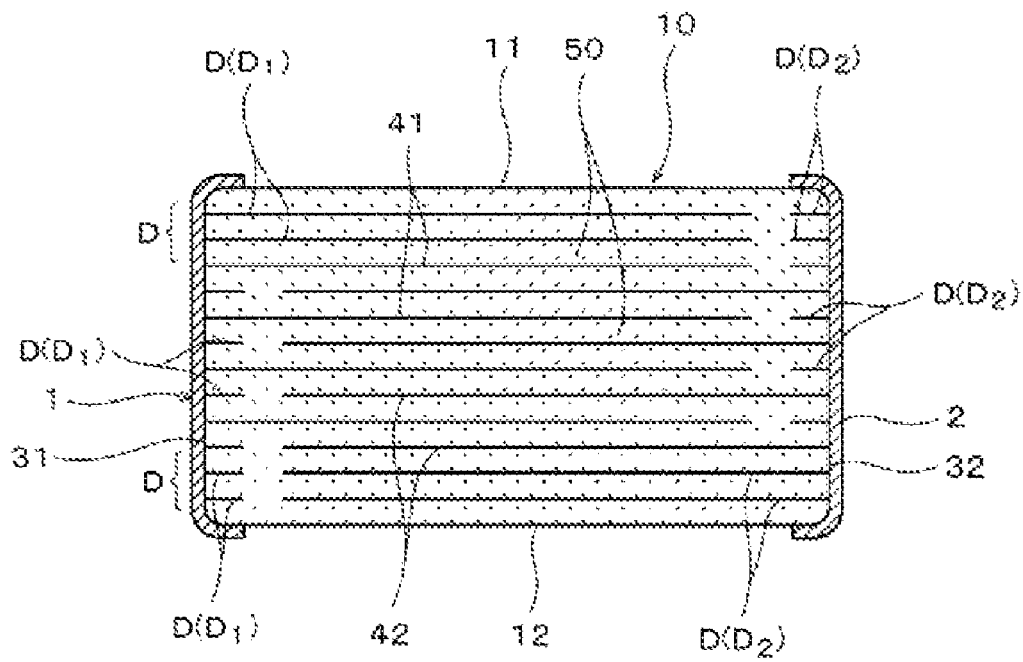
FIG. 6 is a cross section view of a laminated ceramic capacitor according to a third preferred embodiment of the present invention.

FIG. 6 shows a laminated ceramic capacitor according to a third preferred embodiment of the present invention. The laminated ceramic capacitor of the third preferred embodiment is configured similarly to the laminated ceramic capacitor of the first preferred embodiment, except that the capacitor body 10 includes dummy internal electrodes D (D1 and D2). In FIG. 6, the portions denoted by the same reference numerals as in FIG. 2 represents the same or similar portions.

In this laminated ceramic capacitor, a first dummy internal electrode D1 extending to the first end surface 31 and a second dummy internal electrode D2 extending to the second end surface 32 preferably are provided. The first and second dummy internal electrodes D1 and D2 are arranged on the same or substantially the same plane as the internal electrodes 41 and 42 disposed between the dielectric layers 50, and are also arranged in the outer layer portion at which the internal electrode is not provided on the outer side in the laminating direction than the region in which the internal electrode is provided.

The laminated ceramic capacitor of the third preferred embodiment can also be produced by a method corresponding to the production method of the laminated ceramic capacitor of the first preferred embodiment.

However, when producing the laminated ceramic capacitor of the third preferred embodiment, a ceramic green sheet defining a functional layer portion in which the internal electrode pattern and the dummy internal electrode pattern are provided, and a ceramic green sheet defining an outer layer in which only the dummy internal electrode pattern is provided are prepared as necessary, and lamination is performed in a predetermined order. In addition, a ceramic green sheet in which neither the internal electrode pattern nor the dummy internal electrode pattern is formed may be interposed between the ceramic green sheet defining the functional layer and the ceramic green sheet defining the outer layer.

Fourth Preferred Embodiment

Figure 7:
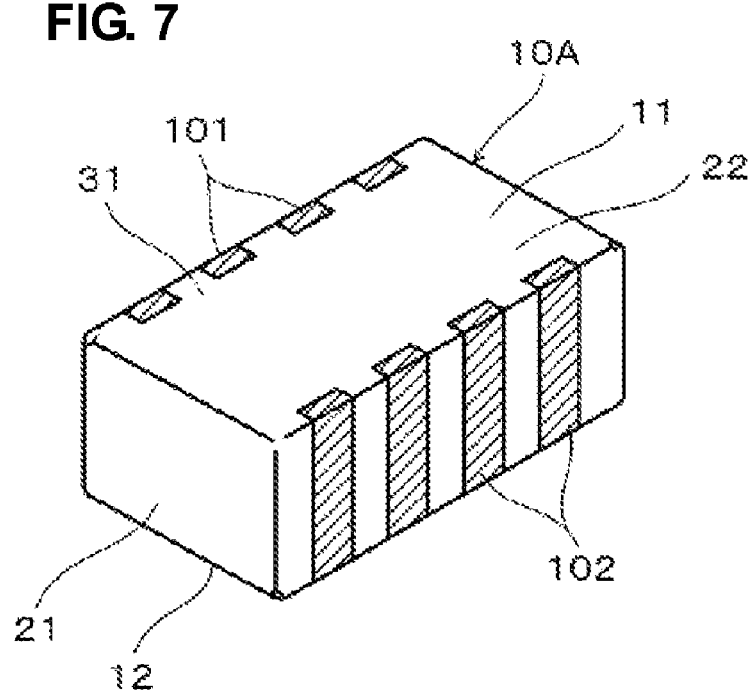
FIG. 7 is a perspective view of an array type laminated ceramic capacitor according to a fourth preferred embodiment of the present invention.
Figure 8:
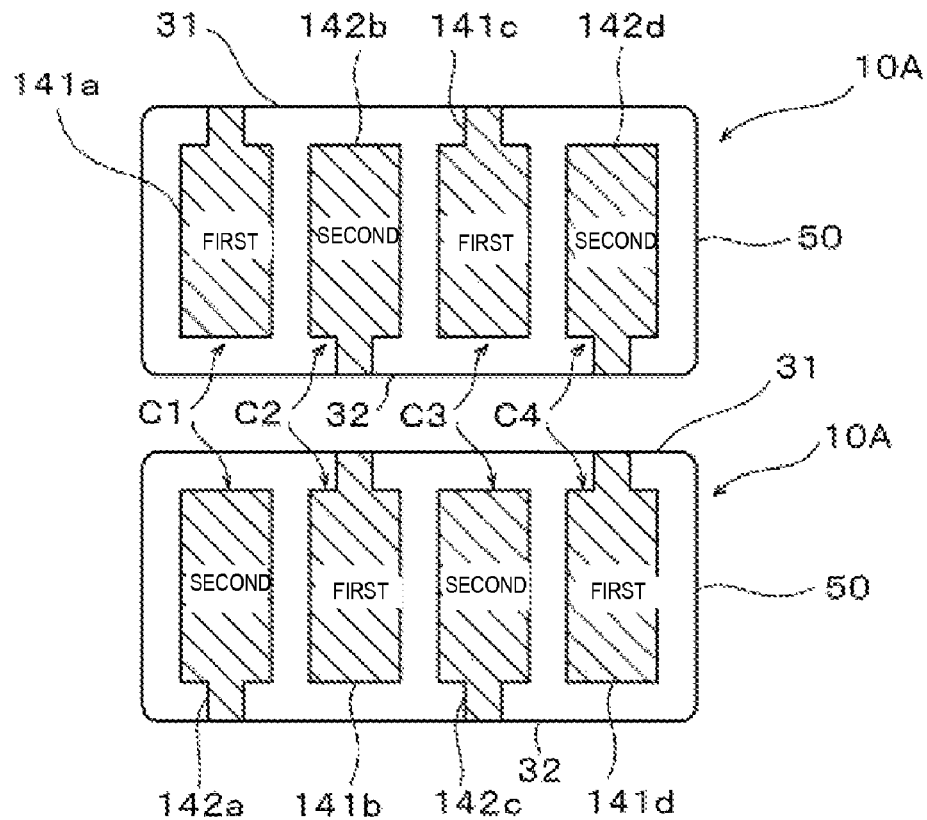
FIG. 8 is a view illustrating an arrangement pattern of a plurality of internal electrodes in the array type laminated ceramic capacitor according to the fourth preferred embodiment of the present invention.

FIG. 7 shows an array type laminated ceramic capacitor according to a fourth preferred embodiment of the present invention, and FIG. 8 shows an arrangement pattern of internal electrodes. As shown in FIG. 7, the array type laminated ceramic capacitor of the fourth preferred embodiment includes a capacitor array body 10A preferably having a substantially rectangular parallelepiped shape including the first main surface 11 and the second main surface 12 that are opposed to each other, the first lateral surface 21 and the second lateral surface 22 that are opposed to each other, and the first end surface 31 and the second end surface 32 that are opposed to each other.

The first end surface 31 of the capacitor array body 10A includes a plurality of first external terminal electrodes 101 provided thereon, and the second end surface 32 includes a plurality of second external terminal electrodes 102 provided thereon. The first external terminal electrodes 101 and the second external terminal electrodes 102 are electrically insulated from each other.

Inside the capacitor array body 10A, as shown in FIG. 8, a plurality of first internal electrodes 141a, 141b, 141c, and 141d and a plurality of second internal electrodes 142a, 142b, 142c, and 142d are preferably arranged so that they are opposed to each other via the dielectric layer 50. That is, the first internal electrodes 141a, 141b, 141c, and 141d, and the second internal electrodes 142a, 142b, 142c, and 142d are preferably alternately arranged along the longitudinal direction of the capacitor array body 10A, when they are viewed in the same or substantially the same plane, while the first internal electrode 141 and the second internal electrode 142 are arranged to be opposed to each other via the dielectric layer 50 when viewed in the laminating direction. As shown in FIG. 8, each of the first internal electrodes 141a, 141b, 141c, and 141d extends to the first end surface 31 and is electrically connected with the first external terminal electrode 101, and each of the second internal electrodes 142a, 142b, 142c, and 142d extends to the second end surface 32 and is electrically connected with the second external terminal electrode 102.

In the array type laminated ceramic capacitor of the fourth preferred embodiment, four capacitor units C1, C2, C3, and C4, for example, that are defined by respective ones of the first internal electrodes 141 and respective ones of the second internal electrodes 142 that are opposed to each other via the dielectric layer 50 are preferably arranged along the longitudinal direction of the capacitor array body 10A.

In addition, in the array type laminated ceramic capacitor according to the fourth preferred embodiment, each external terminal electrode is preferably configured similarly to the external terminal electrodes of the first preferred embodiment, and preferably includes a plating film, an upper layer first plating film defined by a Ni plating film and an upper layer second plating film defined by as Sn plating film, for example.

The laminated ceramic capacitor of the fourth preferred embodiment can also be produced by a method corresponding to the production method of the laminated ceramic capacitor of the first preferred embodiment. However, it is preferable to use a ceramic green sheet in which an internal electrode pattern corresponding to the shape of the internal electrode is arranged, and to form external terminal electrodes on the outer surfaces of the capacitor array body such that they cover each exposed portion of each internal electrode.

Fifth Preferred Embodiment

Figure 9:
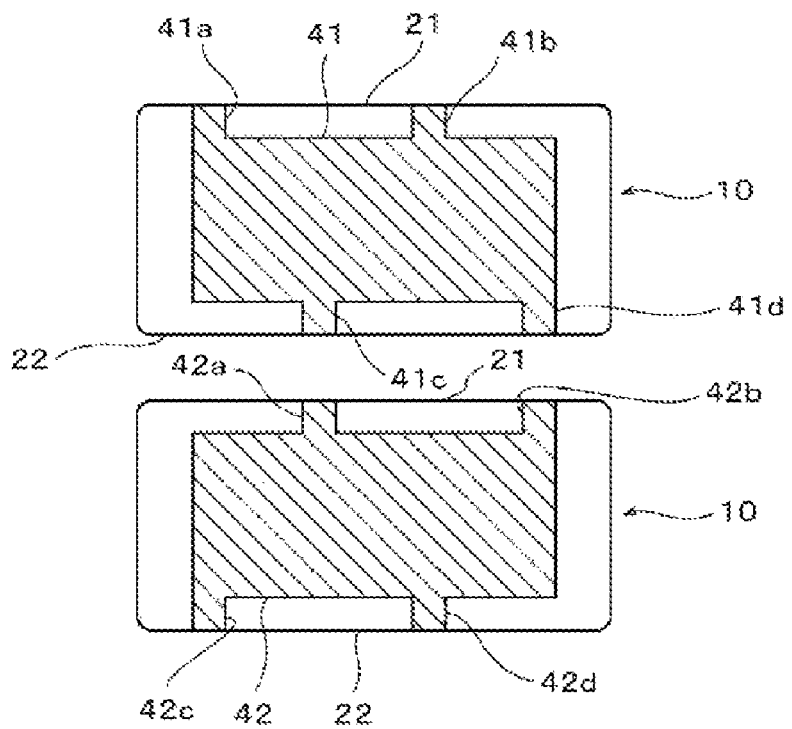
FIG. 9 is a view showing a multi-terminal type low ESL laminated ceramic capacitor according to a fifth preferred embodiment of the present invention.

FIG. 9 shows an internal electrode pattern of a multi-terminal type, low ESL laminated ceramic capacitor according to a fifth preferred embodiment of the present invention.

In the laminated ceramic capacitor of the fifth preferred embodiment, the first internal electrode 41 includes a plurality of (preferably four in the fifth preferred embodiment, for example) lead portions 41a, 41b, 41c, and 41d, and the second internal electrode 42 also includes a plurality of (preferably four in the fifth preferred embodiment, for example) lead portions 42a, 42b, 42c, and 42d.

In each of the first lateral surface 21 and the second lateral surface 22, as shown in FIG. 9, the lead portions 41a, 41b, 41c, and 41d of the first internal electrode 41 and the lead portions 42a, 42b, 42c, and 42d of the second internal electrode 42 are preferably arranged such that they mesh with each other, or are arranged in the following manner when viewed two-dimensionally, (a) one lead portion 41b of the first internal electrode 41 is arranged between the lead portions 42a and 42b of the second internal electrode 42, (b) another lead portion 41c of the first internal electrode 41 is arranged between the lead portions 42c and 42d of the second internal electrode 42, (c) one lead portion 42a of the second internal electrode 42 is arranged between the lead portions 41a and 41b of the first internal electrode 41, and (d) another lead portion 42d of the second internal electrode 42 is arranged between the drawer parts 41c and 41d of the first internal electrode 41.

In addition, in the laminated ceramic capacitor according to the fifth preferred embodiment, the external terminal electrodes are preferably arranged so as to cover portions of the lead portions of the first and second internal electrodes that are exposed to the lateral surfaces of the capacitor body.

Further, in the laminated ceramic capacitor of the fifth preferred embodiment, it is possible to configure the external terminal electrode similar to the external terminal electrodes of the first preferred embodiment as described above. This laminated ceramic capacitor may be produced by a method corresponding to the production method of the laminated ceramic capacitor of the first preferred embodiment. However, it is necessary to use a ceramic green sheet in which an internal electrode pattern corresponding to the shape of the internal electrode is arranged, and to arrange an external terminal electrode on the lateral surface of the capacitor body so that it covers each exposed portion of each internal electrode.

In the following, a preferred embodiment of the present invention will be described by way of an example of a preferred embodiment of the present invention.

The following laminated ceramic capacitor was produced by a method corresponding to the production method of the laminated ceramic capacitor of the first preferred embodiment.

1) Dimension:
Length: L=about 1.0 mm
Width: W=about 0.5 mm
Height: T=about 0.5 mm 2) Material of dielectric layer: barium titanate-based dielectric ceramic 3) Material of internal electrode: Main component: Ni 4) Number of laminated layers: 200 layers (thickness of dielectric layer: about 1 μm)

Next, barrel grinding was performed to sufficiently expose an end portion of the internal electrodes.

The capacitor body was directly plated to form the following external terminal electrodes including a plating film.

The laminated ceramic capacitor was divided into five components, and Cu plating was performed to form external terminal electrodes on each component. The conditions for plating were as follows.

First, the following Cu plating bath was prepared.
Copper sulfate pentahydrate: about 25 g/L
Citric acid monohydrate: about 63 g/L
pH: about 6.5
Bath temperature: about 40° C.

A horizontal rotary barrel having a drum capacity of about 300 cc was dipped in the plating bath. Inside the drum, about 40 mL of Cu media having a diameter of about 0.45 mmφ, and laminated capacitors corresponding to about 20 mL were charged.

Electricity having a current of about 6 A was applied for about 240 minutes to form a Cu plating film having a thickness of about 6 μm.

Next, the barrel including the laminated capacitor was dipped in a Ni plating bath as shown below.
Nickel sulfate: about 300 g/L
Nickel chloride: about 45 g/L
Boric acid: about 40 mg/L
pH: about 4.0
Bath temperature: about 55° C.

Electricity having a current of about 12 A was applied for about 170 minutes, to form a Ni plating film having a thickness of about 4.5 μm. In this manner, Sample 1 of a laminated capacitor in which the external terminal electrode is formed was obtained.

An external electrode terminal was formed by substantially the same method as that for Sample 1, except that the electricity applied to during Cu plating was changed to about 3 A for about 480 hours. In this manner, Sample 2 of a laminated capacitor in which the external terminal electrode is formed was obtained.

An external electrode terminal was formed by substantially the same method as that for Sample 1, except that the Cu plating bath was changed as shown below. In this manner, Sample 3 of a laminated capacitor in which the external terminal electrode is formed was obtained.
Copper pyrophosphate trihydrate: about 90 g/L
Potassium pyrophosphate: about 375 g/L
28% ammonia water: about 3 mL/L
pH: about 8.6
Bath temperature: about 55° C.

An external electrode terminal was formed by substantially the same method as that for Sample 1, except that the Cu plating bath was changed as shown below. In this manner, Sample 4 of a laminated capacitor in which the external terminal electrode is formed was obtained.
Copper pyrophosphate trihydrate: about 90 g/L
Potassium pyrophosphate: about 375 g/L
28% ammonia water: about 3 mL/L
gloss agent ("Pyrobright PY-61" manufactured by Uyemura & Co., Ltd.): about 0.3 mL/L
pH: about 8.6
Bath temperature: about 55° C.

An external electrode terminal was formed by substantially the same method as that for Sample 1, except that the Cu plating bath was changed as shown below. In this manner, Sample 5 of a laminated capacitor in which the external terminal electrode is formed was obtained.
Copper pyrophosphate trihydrate: about 16 g/L
Potassium pyrophosphate: about 180 g/L
Potassium oxalate: about 15 g/L
pH: about 8.7
Bath temperature: about 30° C.

The following evaluations were made for Samples 1 to 5.

(1) Crystal Grain Diameter

External terminal electrodes of Samples 1 to 5 were FIB processed, and an average grain diameter of the crystal grains in the Cu plating film was determined by observing a SIM image of the cross section of the Cu plating film. The result is shown in Table 1.

(2) Sealing Performance

After impregnating Samples 1 to 5 (number of each sample: 40) with a fluorescent liquid (REDGENOL 90C manufactured by Henkel) in vacuo, a heating treatment was performed at about 120° C. for about 15 minutes, to allow curing. Then in an end portion of the plating film 1a or 2a in the cross section of A in FIG. 1 of the laminated capacitor, the entry of the fluorescent liquid was observed. The number of samples in which entry of the fluorescent liquid was observed was counted, and the result is shown in Table 1.

(3) Smoothness of Ni Plating Film

In the approximate center of the Ni plating film of the external terminal electrode in Samples 1 to 5, surface roughness Ra was measured by scanning about 20 μm with a scanning probe microscopy. The result is shown in Table 1.

TABLE 1

|  | Average grain diameter of Cu plating film | Number of defectives in sealing performance | Ni plating film surface Ra |
|---|---|---|---|
| Sample 1 | 0.05 μm | 0 | 30 nm |
| Sample 2 | 0.08 μm | 0 | 50 nm |
| Sample 3 | 0.10 μm | 0 | 55 nm |
| Sample 4 | 0.15 μm | 5 | 70 nm |
| Sample 5 | 0.5 μm | 8 | 100 nm |

As shown in Table 1, Samples 1 to 3 wherein an average grain diameter of the Cu plating film directly plated on the laminated ceramic capacitor body is about 0.1 μm or less were confirmed to have high sealing performance.

In Samples 1 to 3, it was confirmed that the smoothness of the Ni plating film formed on the Cu plating film is increased.

From Table 1, Samples 1 to 3 that are within the scope of the present invention have high sealing performance even without a fired electrode including a glass frit, such that they are suitable for a laminated ceramic capacitor that is reduced in size and that has excellent reliability.

Further, Samples 1 to 3 are advantageous to further reduce the size of the laminated ceramic capacitor because the thickness of the Ni plating, and Sn plating or Au plating disposed thereon is reduced.

In the preferred embodiments of the present invention described above, a laminated ceramic capacitor was described as a non-limiting example. However, preferred embodiments of the present invention may be applied to various laminated electronic components, such as, for example, a laminated chip inductor and a laminated thermistor including an internal conductor disposed inside the electronic component body, and an external terminal electrode disposed on the surface of the electronic component body so as to be electrically connected to the internal conductor.

In the preferred embodiments of the present invention described above, the material defining the electronic component body preferably is a dielectric ceramic. However, the material defining the electronic component body is not limited to a dielectric ceramic, and may be a piezoelectric ceramic, semiconductor ceramic, magnetic ceramic and other suitable material, for example. A resin may also be included in the electronic component body, for example.

The present invention is not limited to the preferred embodiments described above, and various applications and modifications may be made within the scope of the present invention regarding the materials of the internal conductor and the external terminal electrode, the formation method of the external terminal electrode, and the constituent materials, the number of layers, and the formation method of the upper layer plating film of the external terminal electrode.

As described above, according to preferred embodiments of the present invention, the reliability of the laminated electronic component having the external terminal electrode formed by direct plating can be significantly improved. Therefore, preferred embodiments of the present invention can be broadly applied to a variety of laminated electronic components including an internal conductor that is disposed inside the electronic component body and an external terminal electrode that is disposed on the surface of the electronic component body by direct plating so as to be electrically connected to the internal conductor.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A laminated electronic component comprising:
an electronic component body including a plurality of laminated functional layers;
an internal conductor provided inside the electronic component body and including an exposed portion on an outer surface of the electronic component body; and
an external terminal electrode provided on the outer surface of the electronic component body and electrically connected to the internal conductor and arranged to cover the exposed portion of the internal conductor; wherein
the external terminal electrode includes a directly plated film that is directly plated on the outer surface of the electronic component body so as to cover the exposed portion of the internal conductor; and
an average grain diameter of metal grains defining the directly plated film is about 0.1 μm or less.

2. The laminated electronic component according to claim 1, wherein the external terminal electrode further includes at least one upper layer plating film disposed on the directly plated film.

3. The laminated electronic component according to claim 1, wherein the metal grains defining the directly plated film are Cu grains.

* * * * *